US011943034B2

(12) United States Patent
Nilsson et al.

(10) Patent No.: US 11,943,034 B2
(45) **Date of Patent: *Mar. 26, 2024**

(54) BEAM MANAGEMENT AND PARTICIPATION IN A BEAM MANAGEMENT PROCEDURE

(71) Applicant: Telefonaktiebolaget LM Ericsson (publ), Stockholm (SE)

(72) Inventors: Andreas Nilsson, Gothenburg (SE); Fredrik Athley, Kullavik (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,193

(22) Filed: Jul. 22, 2022

(65) Prior Publication Data

US 2023/0016987 A1 Jan. 19, 2023

Related U.S. Application Data

(63) Continuation of application No. 17/052,331, filed as application No. PCT/EP2018/061633 on May 4, 2018, now Pat. No. 11,431,397.

(51) Int. Cl.

| | |
|---|---|
| ***H04B 7/06*** | (2006.01) |
| ***H04B 7/08*** | (2006.01) |
| ***H04L 5/00*** | (2006.01) |

(52) U.S. Cl.

CPC ......... *H04B 7/0695* (2013.01); *H04B 7/0632* (2013.01); *H04B 7/088* (2013.01); *H04L 5/0051* (2013.01)

(58) Field of Classification Search

CPC .................................................... H04B 7/0695
USPC .......................................................... 375/267
See application file for complete search history.

(56) References Cited

U.S. PATENT DOCUMENTS 10,277,349 B1 4/2019 Kotecha et al.
11,431,397 B2 * 8/2022 Nilsson ................ H04B 7/0632
(Continued)

FOREIGN PATENT DOCUMENTS

CN 107466461 A 12/2017
JP 2019535179 A 12/2019
(Continued)

OTHER PUBLICATIONS

"3GPP TR 38.802 V14.2.0", 3rd Generation Partnership Project; Technical Specification Group Radio Access Network; Study on New Radio Access Technology Physical Layer Aspects (Release 14), Sep. 2017, pp. 1-145.
(Continued)

*Primary Examiner* — Lihong Yu
(74) *Attorney, Agent, or Firm* — Murphy, Bilak & Homiller, PLLC

(57) ABSTRACT

Mechanisms for beam management. An example method, in a network node, comprises transmitting a reference signal so as to enable each of the terminal devices participating in a first part of the beam management procedure to identify in which of a first set of beams the reference signal is received with highest power. The method comprises transmitting the reference signal in a second part of the procedure so as to enable each of the terminal devices to identify in which of a second set of beams the reference signal is received with highest power. The method comprises transmitting the reference signal during a third part of the procedure so as to enable each of the terminal devices to identify in which of a third set of beams the reference signal is received with highest power. There is one third set for each beam in the first set.

19 Claims, 9 Drawing Sheets

(56) References Cited

U.S. PATENT DOCUMENTS

| | | | |
|---|---|---|---|
| 2010/0330928 | A1 | 12/2010 | Prasad et al. |
| 2013/0102345 | A1 | 4/2013 | Jung |
| 2015/0333894 | A1 | 11/2015 | Wang et al. |
| 2016/0028519 | A1 | 1/2016 | Wei |
| 2016/0119043 | A1 | 4/2016 | Rajagopal et al. |
| 2017/0331544 | A1 | 11/2017 | Athley et al. |
| 2018/0049042 | A1 | 2/2018 | Yu et al. |
| 2018/0083680 | A1 | 3/2018 | Guo et al. |

FOREIGN PATENT DOCUMENTS

| | | | |
|---|---|---|---|
| WO | 2017045713 | A1 | 3/2017 |
| WO | 2017194094 | A1 | 11/2017 |
| WO | 2017200436 | A1 | 11/2017 |
| WO | 2018064348 | A1 | 4/2018 |
| WO | 2018067059 | A1 | 4/2018 |

OTHER PUBLICATIONS

"CSI-RS design for beam management", 3GPPTSG RAN WGI Meeting #88bis; R1-1704235; Spokane, USA, Apr. 3-7, 2017, pp. 1-9.

"Views on NR Beam Management", 3GPP TSG RAN WG1 Meeting #91, R1-1720803, Reno, USA, Nov. 27-Dec. 1, 2017, pp. 1-11.

Unknown, Author , "Beam management procedure and beam reporting for NR", 3GPP TSG RAN WG1 Meeting #88, R1-1703388, Athens, Greece, Feb. 13-17, 2017, 1-5.

* cited by examiner

BEAM MANAGEMENT AND PARTICIPATION IN A BEAM MANAGEMENT PROCEDURE

TECHNICAL FIELD

Embodiments presented herein relate to a method, a network node, a computer program, and a computer program product for beam management. Embodiments presented herein further relate to a method, a terminal device, a computer program, and a computer program product for participating in a beam management procedure.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the network node and the beam used by the terminal device) is expected to be discovered and monitored by the network using measurements on downlink reference signals, such as channel state information reference signals (CSI-RS) or synchronization signal block (SSB) signals, used for beam management.

The reference signals for beam management can be transmitted periodically, semi-persistently or aperiodically (event triggered) and they can be either shared between multiple terminal devices or be device-specific. In order for the terminal device to find a suitable network node beam, the network node transmits the reference signal in different transmission (TX) beams on which the terminal device performs measurements, such as reference signal received power (RSRP), and reports back the N best TX beams (where N can be configured by the network). Furthermore, the transmission of the reference signal on a given TX beam can be repeated to allow the terminal device to evaluate a suitable reception (RX) beam.

In general terms, the beam management procedure might be divided into three procedures, as schematically illustrated in FIG. 1, see also Section 6.1.6.1 in 3GPP TR 38.802 V 14.2.0. The general purpose of the first phase (P-1 procedure) is for the network node 200 to find a coarse direction towards each terminal device 300*a*, 300*b*, 300*c*, 300*d*, 300*e*, 300*f* using wide transmission beams 140*a*, 140*b*, 140*c* at the network node 200, where the sweep of transmission beams 140*a*, 140*b*, 140*c* are covering the whole angular sector served by the network node 200. The P-1 procedure might be based on using beams 140*a*, 140*b*, 140*c* with rather large beam widths and where the reference signals might be transmitted periodically and are shared between all terminal devices 300*a*-300*f* served by the network node 200. The terminal devices 300*a*-300*f* receives the reference signals in wide beams 150 and then reports the N best beams and their corresponding RSRP values to the network node 200. The beam reporting from the terminal devices 300*a*-300*f* to the network node 200 can be performed in a separate time manner compared to the transmitted reference signals and can be either periodic, semi-persistent or aperiodic. By using aperiodic beam reporting the beam reporting can be done only when needed and in that way save overhead signaling.

The general purpose of the second phase (P-2 procedure) is to refine the transmission beams at the network node 200 by performing a new beam search around each coarse direction found in the P-1 procedure. The P-2 procedure might be based on using aperiodic or semi-persistent reference signals transmitted in narrow beams centered around the coarse direction found during the P-1 procedure to refine the transmission beam at the network node 200. FIG. 1 schematically illustrates how a refined beam search is made in narrow beams 140*b-a*, 140*b-b-*, 140*b-c* covered by the wide beam 140*b*. It is here noted that for illustrative purposes the narrow beams 140*b-a*, 140*b-b*, 140*b-c* in FIG. 1 collectively have a wider angular span than the wide beam 140*b*.

The general purpose of the third phase (P-3 procedure) is to find a suitable receive beam at each terminal device 300*a*-300*f* participating in the beam management procedure. During the P-3 procedure, the narrow transmission beam at the network node 200 is fixed for each occurrence of the P-3 procedure, allowing the terminal devices 300*a*-300*f* to evaluate different narrow receive beams 150*a*, 150*b*, 150*c*. The P-3 procedure might be based on using aperiodic or semi-persistent reference signals transmitted in the best narrow beam reported by the terminal devices 300*a*-300*f* in the P-2 procedure so that the terminal devices 300*a*-300*f* can perform and receive beam sweep to find its best narrow beam. As illustrated in FIG. 1, one occurrence of the P-3 procedure is performed per terminal device 300*b*, 300*c*, 300*d*, where these terminal device 300*b*, 300*c*, 300*d* all have reported wide beam 140*b* as best beam in the P-1 procedure.

The P-2 and P-3 procedures are might be performed more frequently than the P-1 procedure in order to track movements of the terminal devices, rotations of the terminal devices, and/or changes in the radio propagation environment. The P-2 and P-3 procedures are typically device-specific, however it is possible for terminal devices to measure on the same CSI-RS resources and in that way share the P-2/P-3 procedure in order to save overhead.

FIG. 2 illustrates one example of a beam space 400 with one set of narrow beams 450 (all circles with solid lines denoted NB1-NB32) and one set of wide beams 420 (all ellipses with dash-dotted lines denoted WB1-WB4). The beams 420, 450 collectively cover a network coverage region 410 (dotted line). In this respect, the illustration in FIG. 2 is somewhat simplified since the narrow beams 450 as well as the wider beams 420 in reality should have a slight overlap in order to avoid network coverage holes in the network coverage region 410. The wide beams 420 could be used in the first phase (P-1 procedure) of the beam management procedure to find a respective coarse direction towards each respective terminal device. The narrow beams 450 within the selected wide beams could be used in the second phase (P-2 procedure) and third phase (P-3 procedure) of the beam management procedure in order to find a narrow TX beam to each of the terminal devices and a narrow RX beam at each of the terminal devices. In this respect, one typical way to select the narrow beams to be used for the P-2 procedure is to determine which of the wide beams that was best with respect to RSRP and then select the narrow beams that are confined within the angular coverage area of that wide beam. As an illustrative example, assume that wide beam WB1 was reported as best wide beam for a particular terminal device, then the beams used during for the P-2 procedure and the P-3 procedure for this particular terminal device would be the narrow beams NB1-NB8.

Since some network nodes, for example where analog beam formers are used to generate the beams, only can use one beam at each time instance for transmission/reception, the required overhead for transmitting CSI-RSs during beam management procedures can be very large, especially if there are many terminal devices 300*a*-300*f* served by the network node 200.

Hence, there is still a need for an improved beam management.

SUMMARY

An object of embodiments herein is to provide an efficient beam management procedure that does not suffer from the issues noted above, or at least where the above issues are mitigated or reduced.

According to a first aspect there is presented a method for beam management. The method is performed by a network node. The method comprises performing a beam management procedure for terminal devices served by the network node. The method comprises transmitting, during a first part of the beam management procedure, a reference signal so as to enable each of the terminal devices participating in the beam management procedure to identify in which beam in a first set of beams, in which the reference signal is transmitted from the network node, the reference signal is received with highest received power. The method comprises transmitting, during a second part of the beam management procedure, the reference signal so as to enable each of the terminal devices to identify in which beam in a second set of beams, in which the reference signal is received from the network node by the terminal devices, the reference signal is received with highest received power.

The method comprises transmitting, during a third part of the beam management procedure, the reference signal so as to enable each of the terminal devices participating in the beam management procedure to identify for which beam in a third set of beams, in which the reference signal is transmitted from the network node, the reference signal is received with highest received power. There is one respective third set of beams for each respective beam in the first set of beams. The third part of the beam management procedure is performed for each respective third set of beams. The second part is performed before the third part at least for one of the respective third set of beams.

According to a second aspect there is presented a network node for beam management. The network node comprises processing circuitry. The processing circuitry is configured to cause the network node to perform a beam management procedure for terminal devices served by the network node. The processing circuitry is configured to cause the network node to transmit, during a first part of the beam management procedure, a reference signal so as to enable each of the terminal devices participating in the beam management procedure to identify in which beam in a first set of beams, in which the reference signal is transmitted from the network node, the reference signal is received with highest received power. The processing circuitry is configured to cause the network node to transmit, during a second part of the beam management procedure, the reference signal so as to enable each of the terminal devices to identify in which beam in a second set of beams, in which the reference signal is received from the network node by the terminal devices, the reference signal is received with highest received power. The processing circuitry is configured to cause the network node to transmit, during a third part of the beam management procedure, the reference signal so as to enable each of the terminal devices participating in the beam management procedure to identify for which beam in a third set of beams, in which the reference signal is transmitted from the network node, the reference signal is received with highest received power. There is one respective third set of beams for each respective beam in the first set of beams. The third part of the beam management procedure is performed for each respective third set of beams. The second part is performed before the third part at least for one of the respective third set of beams.

According to a third aspect there is presented a network node for beam management. The network node comprises a beam management module configured to perform a beam management procedure for terminal devices served by the network node. The network node comprises a transmit module configured to transmit), during a first part of the beam management procedure, a reference signal so as to enable each of the terminal devices participating in the beam management procedure to identify in which beam in a first set of beams, in which the reference signal is transmitted from the network node, the reference signal is received with highest received power. The network node comprises a transmit module configured to transmit, during a second part of the beam management procedure, the reference signal so as to enable each of the terminal devices to identify in which beam in a second set of beams, in which the reference signal is received from the network node by the terminal devices, the reference signal is received with highest received power. The network node comprises a transmit module configured to transmit, during a third part of the beam management procedure, the reference signal so as to enable each of the terminal devices participating in the beam management procedure to identify for which beam in a third set of beams, in which the reference signal is transmitted from the network node, the reference signal is received with highest received power. There is one respective third set of beams for each respective beam in the first set of beams. The third part of the beam management procedure is performed for each respective third set of beams. The second part is performed before the third part at least for one of the respective third set of beams.

According to a fourth aspect there is presented a computer program for beam management. The computer program comprises computer program code which, when run on processing circuitry of a network node, causes the network node to perform a method according to the first aspect.

According to a fifth aspect there is presented a method for participating in a beam management procedure. The method is performed by a terminal device. The method comprises participating in a beam management procedure with a network node serving the terminal device. The method comprises identifying, during a first part of the beam management procedure, which beam in a first set of beams, in which a reference signal is transmitted from the network node, is received with highest received power. The method comprises identifying, during a second part of the beam management procedure, in which beam in a second set of beams, in which the reference signal is received from the network node, is received with highest received power. The method comprises identifying, during a third part of the beam management procedure, which beam in a third set of beams, in which the reference signal is transmitted from the network node, that the reference signal with highest received power. The reference signal is received using the beam identified during the second part of the beam management procedure.

According to a sixth aspect there is presented a terminal device for participating in a beam management procedure. The terminal device comprises processing circuitry. The processing circuitry is configured to cause the terminal device to participate in a beam management procedure with a network node serving the terminal device. The processing circuitry is configured to cause the terminal device to identify, during a first part of the beam management procedure, which beam in a first set of beams, in which a reference signal is transmitted from the network node, is received with highest received power. The processing circuitry is configured to cause the terminal device to identify, during a second part of the beam management procedure, in which beam in a second set of beams, in which the reference signal is received from the network node, is received with highest received power. The processing circuitry is configured to cause the terminal device to identify, during a third part of the beam management procedure, which beam in a third set of beams, in which the reference signal is transmitted from the network node, that the reference signal with highest received power. The reference signal is received using the beam identified during the second part of the beam management procedure.

According to a seventh aspect there is presented a terminal device for participating in a beam management procedure. The terminal device comprises a beam management module configured to participate in a beam management procedure with a network node serving the terminal device. The terminal device comprises an identify module configured to identify, during a first part of the beam management procedure, which beam in a first set of beams, in which a reference signal is transmitted from the network node, is received with highest received power. The terminal device comprises an identify module configured to identify, during a second part of the beam management procedure, in which beam in a second set of beams, in which the reference signal is received from the network node, is received with highest received power. The terminal device comprises an identify module configured to identify, during a third part of the beam management procedure, which beam in a third set of beams, in which the reference signal is transmitted from the network node, that the reference signal with highest received power. The reference signal is received using the beam identified during the second part of the beam management procedure.

According to an eighth aspect there is presented a computer program for participating in a beam management procedure, the computer program comprising computer program code which, when run on processing circuitry of a terminal device, causes the terminal device to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these network nodes, these terminal devices, and these computer programs enable an efficient beam management procedure to be performed.

Advantageously this beam management procedure does not suffer from the issues noted above.

Advantageously these methods, these network nodes, these terminal devices, and these computer programs enable the overhead signaling for beam management to be reduced since several terminal devices can share the beam management procedure in an efficient manner.

Advantageously this beam management procedure allows the second part and the third part to be shared by groups of terminal devices.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 3:
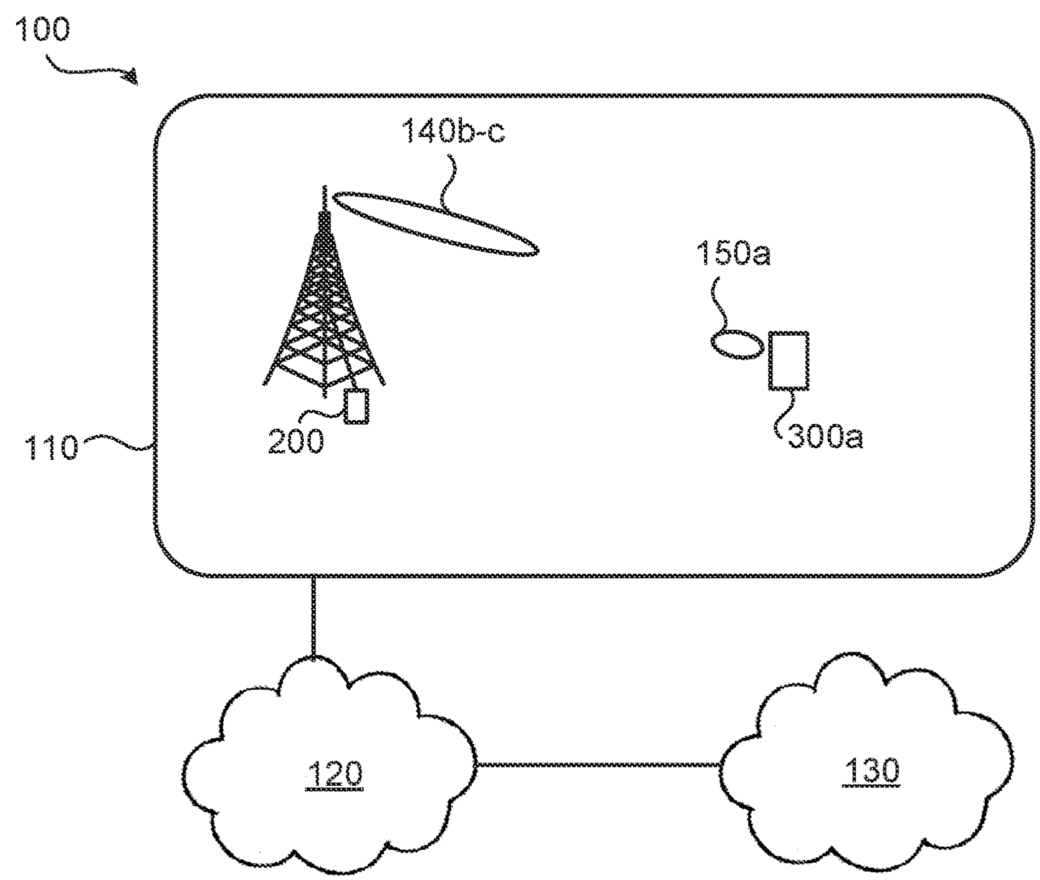
FIG. 3 is a schematic diagram illustrating a communication network according to embodiments.

FIG. 3 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a network node 200 configured to provide network access to at least one terminal device 300*a* in a radio access network 110. The radio access network 110 is operatively connected to a core network 120. The core network 120 is in turn operatively connected to a service network 130, such as the Internet. The terminal device 300*a* is thereby, via the network node 200, enabled to access services of, and exchange data with, the service network 130.

Examples of network nodes 200 are radio access network nodes, radio base stations, base transceiver stations, Node Bs, evolved Node Bs, g Node Bs, access points, and access nodes, and backhaul nodes. Examples of terminal devices 300*a* are wireless devices, mobile stations, mobile phones, handsets, wireless local loop phones, user equipment (UE), smartphones, laptop computers, tablet computers, network equipped sensors, network equipped vehicles, and so-called Internet of Things devices.

The network node 200 is configured to communicate with the terminal device 300*a* in beams, one of which is illustrated at reference numeral 140*b-c*, and the terminal device 300*a* is configured to communicate with the network node 200 in beams, one of which is illustrated at reference numeral 150*a*. Further, the network node 200 and the terminal device 300*a* could be configured to communicate with each other using a variety of beams having different shapes and widths, herein generally referred to as having different beam patterns.

As disclosed above, beam management is performed in order for the network node 200 and the terminal devices 300*a*-300*f* to know what beams to use for communication with each other. Issues with traditional beam management procedures have been disclosed above. An object of embodiments herein is therefore to provide an efficient beam management procedure that does not suffer from the issues noted above, or at least where the above issues are mitigated or reduced.

The embodiments disclosed herein thus relate to mechanisms for beam management and participating in a beam management procedure. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a terminal device 300*a*, a method performed by the terminal device 300*a*, and a computer program product comprising code, for example in the form of a computer program, that when run on processing circuitry of the terminal device 300*a*, causes the terminal device 300*a* to perform the method.

Figure 4:
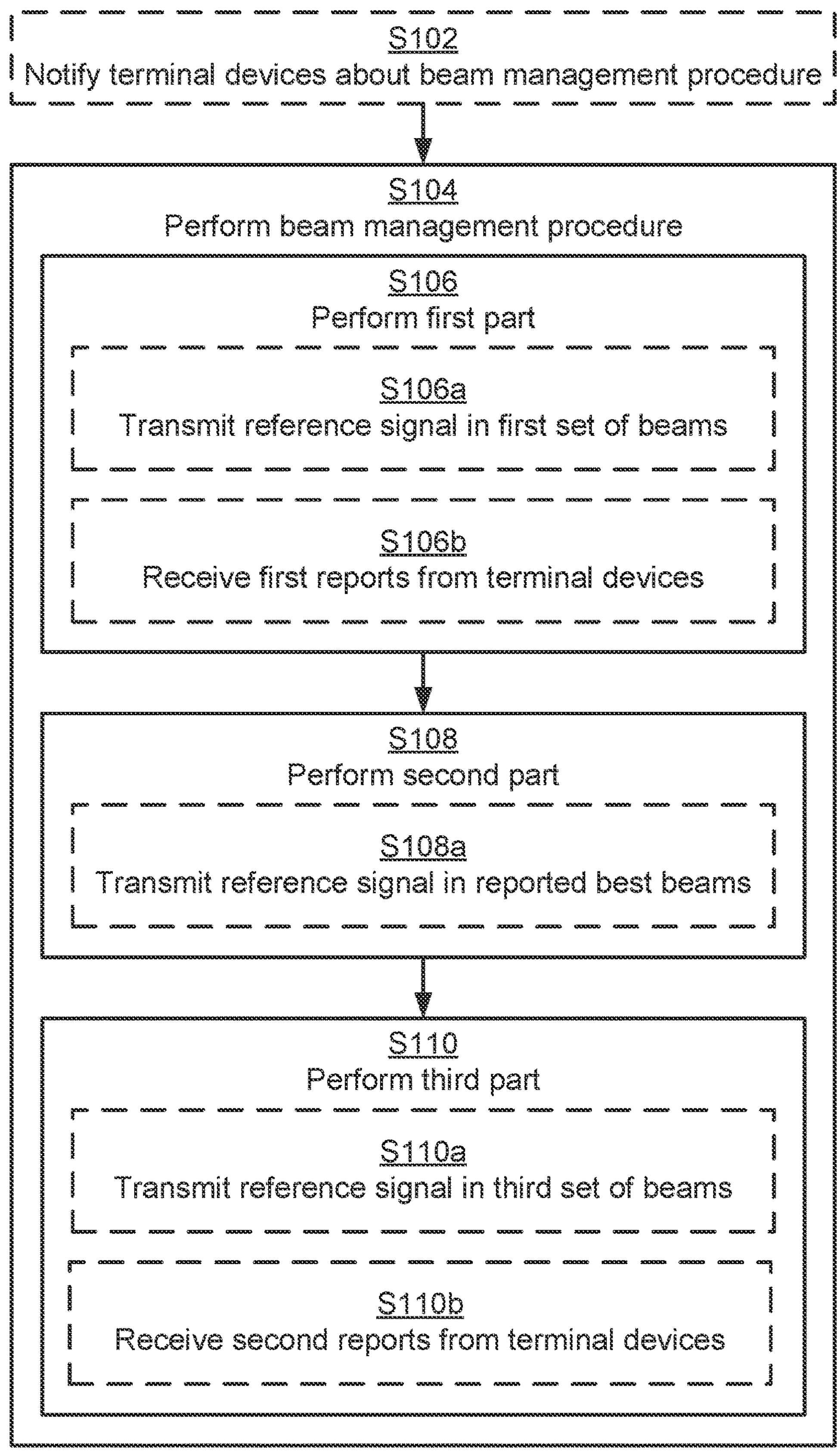
FIGS. 4 and 5 are flowcharts of methods according to embodiments.

Reference is now made to FIG. 4 illustrating a method for beam management as performed by the network node 200 according to an embodiment.

It is assumed that a beam management procedure is to be performed. Hence, the network node 200 is configured to perform step S104:

S104: The network node 200 performs a beam management procedure for terminal devices 300*a*-300*f* served by the network node 200. Performing the beam management procedure comprises steps S106, S108, and S110.

The beam management procedure comprises a first part. Particularly, the network node 200 is configured to perform step S106:

S106: The network node 200 transmits, during a first part of the beam management procedure, a reference signal so as to enable each of the terminal devices (300*a*-300*f*) participating in the beam management procedure to identify in which beam in a first set of beams 140*a*, 140*b*, 140*c*, in which the reference signal is transmitted from the network node 200, the reference signal is received with highest received power. The first set of beams 140*a*, 140*b*, 140*c* is thus used by the network node 200 for transmitting the reference signal.

The beam management procedure comprises a second part. Particularly, the network node 200 is configured to perform step S108:

S108: The network node 200 transmits, during a second part of the beam management procedure, the reference signal so as to enable each of the terminal devices 300*a*-300*f* (participating in the beam management procedure) to identify in which beam in a second set of beams 150*a*, 150*b*, 150*c*, in which the reference signal is received from the network node 200 by the terminal devices 300*a*-300*f* (participating in the beam management procedure), the reference signal is received with highest received power. The second set of beams 150*a*, 150*b*, 150*c* is thus used by the terminal devices 300*a*-300*f* for receiving the reference signal.

The beam management procedure comprises a third part. Particularly, the network node 200 is configured to perform step S110:

S110: The network node transmits, during a third part of the beam management procedure, the reference signal so as to enable each of the terminal devices 300*a*-300*f* participating in the beam management procedure to identify for which beam in a third set of beams 140*b-a*, 140*b-b*, 140*b-c*, in which the reference signal is transmitted from the network node 200, the reference signal is received with highest received power. The third set of beams 140*b-a*, 140*b-b*, 140*b-c* is thus used by the network node 200 for transmitting the reference signal.

There is one respective third set of beams 140*b-a*, 140*b-b*, 140*b-c* for each respective beam 140*b* in the first set of beams 140*a*, 140*b*, 140*c*. The third part of the beam management procedure is performed for each respective third set of beams 140*b-a*, 140*b-b*, 140*b-c*. The second part is performed before the third part at least for one of the respective third set of beams 140*b-a*, 140*b-b*, 140*b-c*.

Thereby, after the terminal devices 300*a*-300*f* have reported the best beam from first part of the beam management procedure, a shared second part of the beam management procedure can be performed for all terminal devices having reported the same best beam. Further, this also allows the third part of the beam management procedure to be shared for these terminal devices.

Embodiments relating to further details of beam management as performed by the network node 200 will now be disclosed.

In some aspects the network node 200 provides information to the terminal devices 300a-300f about the beam management procedure. Particularly, according to an embodiment the network node 200 is configured to perform (optional) step S102:

S102: The network node 200 provides, to the terminal devices 300a-300f, information regarding the beam management procedure before performing the beam management procedure.

The information might define a point in time at which the beam management procedure is to be performed, the order in which the first, second, and third part of the beam management procedure are to be performed, etc.

There could be different types of reference signals that the network node 200 transmits. Examples include, but are not limited to, channel state information reference signals (CSI-RS), and synchronization signal block (SSB).

Aspects of the first part of the beam management procedure will now be disclosed.

The first part of the beam management procedure might involve the network node 200 to transmit the reference signal in each beam in the first set of beams 140a, 140b, 140c. Particularly, according to an embodiment the network node 200 is configured to perform (optional) step S106a:

S106a: The network node 200 transmits, towards terminal devices 300a-300f served by the network node 200, one occurrence of the reference signal in each beam in the first set of beams 140a, 140b, 140c.

Step S106a is in some aspects part of step S106.

The first part of the beam management procedure might involve the terminal devices 300a-300f participating in the beam management procedure to measure received power on the reference signal as transmitted in the beams in the first set of beams 140a, 140b, 140c and then to report this to the network node 200. Particularly, according to an embodiment the network node 200 is configured to perform (optional) step S106b:

S106b: The network node 200 receives, from each of the terminal devices 300a-300f (participating in the beam management procedure), a respective first report. The first report for a particular terminal device 300a-300f identifies at least that beam in the first set of beams 140a, 140b, 140c having been received with highest received power at that particular terminal device 300a-300f.

In some aspects the first part of the beam management procedure is part of the above-mentioned P-1 procedure.

Aspects of the second part of the beam management procedure will now be disclosed.

The second part of the beam management procedure might involve the network node 200 to transmit the reference signal in those beams in the first set of beams 140a, 140b, 140c for which at least one first report has been received. In this respect, one occurrence of the second part of the beam management procedure might thus be performed for each of those beams in the first set of beams 140a, 140b, 140c for which at least one first report has been received. Particularly, according to an embodiment the network node 200 is configured to perform (optional) step S108a for each occurrence of the second part of the beam management procedure:

S108a: The network node 200 transmits a configured number of occurrences of the reference signal in one of those beams in the first set of beams 140a, 140b, 140c for which at least one first report has been received.

Step S108a might thus be repeated for each of those beams in the first set of beams 140a, 140b, 140c for which at least one first report has been received.

Step S108a is in some aspects part of step S108.

Each occurrence of the second part of the beam management procedure might be shared by a respective group of terminal devices. Particularly, according to an embodiment one occurrence of the second part of the beam management procedure is performed per beam in the first set of beams 140a, 140b, 140c for which at least one first report has been received. Each occurrence of the second part of the beam management procedure is performed for all those of the terminal devices 300a-300f for which the same beam in the first set of beams 140a, 140b, 140c was received with highest received power. In the illustrative example of below referenced FIG. 6, terminal devices 300b, 300c, 300d all report beam 140b as strongest and thus form a group of terminal devices that share one occurrence of the second part of the beam management procedure.

There might be different ways to determine the configured number of occurrences of the reference signal. In some aspects the reference signal is transmitted as many times as there are number of narrow beams at the terminal devices 300a-300f. Particularly, according to an embodiment the configured number of occurrences is defined by number of beams in the second set of beams 150a, 150b, 150c. In the illustrative example of below referenced FIG. 6, terminal devices 300b, 300c, 300d all have three narrow beams 150a, 150b, 150c and thus the reference signal might be transmitted three times in beam 140b during this occurrence of the second part of the beam management procedure. If there are terminal devices 300b, 300c, 300d with different number of narrow beams 150a, 150b, 150c then the reference signal might be transmitted as many times as the highest number of narrow beams during this occurrence of the second part of the beam management procedure.

It might be so that different terminal devices, or groups thereof, report different best beams in the first set of beams 140a, 140b, 140c. In the illustrative example of below referenced FIG. 6, terminal device 300a is likely to report beam 140a as best beam, whereas terminal devices 300b, 300c, 300d are likely to report beam 140b as best beam.

There might be different ways to determine for which beam in the first set of beams 140a, 140b, 140c to perform the second part of the beam management procedure first. In some aspects the order is determined by the number of terminal devices 300a-300f reporting that a certain beam 140a, 140b, 140c is best. Particularly, according to an embodiment, in which order to perform the second part of the beam management procedure for, with respect to the beams in the first set of beams 140a, 140b, 140c, depends on how many of the terminal devices 300a-300f have identified each of the beams in the first set of beams 140a, 140b, 140c as received with highest received power.

Other criteria might depend on the type of service provided to the terminal devices 300a-300f, such that the second part of the beam management procedure is first performed for a beam in the first set of beams 140a, 140b, 140c serving a group of terminal devices 300a-300f with a relative high level of service, or high level of service demand, etc.

In some aspects the second part of the beam management procedure is part of the above-mentioned P-3 procedure.

Aspects of the third part of the beam management procedure will now be disclosed.

The third part of the beam management procedure might involve the network node 200 to transmit the reference signal in those beams 140b-a, 140b-b, 140b-c covered by those beams in the first set of beams 140a, 140b, 140c being identified in the first reports. In this respect, one occurrence of the third part of the beam management procedure might thus be performed for each of those beams in the first set of beams 140*a*, 140*b*, 140*c* for which at least one first report has been received. Particularly, according to an embodiment the network node 200 is configured to perform (optional) step S110*a* for each occurrence of the third part of the beam management procedure:

S110*a*: The network node 200 transmits one occurrence of the reference signal in each beam in that respective third set of beams 140*b-a*, 140*b-b*, 140*b-c* covered by one of those beams in the first set of beams 140*a*, 140*b*, 140*c* being identified in the respective first reports.

Step S110*a* might thus be repeated for each set of third beams as covered by those beams in the first set of beams 140*a*, 140*b*, 140*c* for which at least one first report has been received.

Step S110*a* is in some aspects part of step S110.

The third part of the beam management procedure might involve the terminal devices 300*a*-300*f* receiving the reference signal in step S110*a* to measure received power on the reference signal as transmitted in the beams in the third set of beams 140*b-a*, 140*b-b*, 140*b-c* and then to report this to the network node 200. Particularly, according to an embodiment the network node 200 is configured to perform (optional) step S110*b:*

S110*b*: The network node 200 receives, from each of the terminal devices 300*a*-300*f* having received the reference signal in at least one of the beams in the third set of beams 140*b-a*, 140*b-b*, 140*b-c*, a respective second report. The second report for a particular terminal device 300*a*-300*f* identifies at least that beam in the third set of beams 140*b-a*, 140*b-b*, 140*b-c* having been received with highest received power at that particular terminal device 300*a*-300*f.*

Step S110*b* is in some aspects part of step S110.

Each occurrence of the third part of the beam management procedure might be shared by a respective group of terminal devices. Particularly, according to an embodiment one occurrence of the third part of the beam management procedure is performed per third set of beams 140*b-a*, 140*b-b*, 140*b-c*. Each occurrence of the third part of the beam management procedure is performed for all those of the terminal devices 300*a*-300*f* for which same the beam in the first set of beams 140*a*, 140*b*, 140*c* was received with highest received power. In the illustrative example of below referenced FIG. 6, terminal devices 300*b*, 300*c*, 300*d* all report beam 140*b* as strongest and thus form a group of terminal devices that share one occurrence of the third part of the beam management procedure. One occurrence of the third part of the beam management procedure might be shared by the same group of terminal devices having shared one occurrence of the second part of the beam management procedure.

In some aspects the third part of the beam management procedure is part of the above-mentioned P-2 procedure.

Aspects of the order in which the second part and the third part of the beam management procedure are performed will now be disclosed.

According to a first example the beam management procedure is performed according to a first configuration such that all occurrences of the second part of the beam management procedure are performed before any occurrence of the third part of the beam management procedure are performed. In some aspects all occurrences of the P-3 procedure are thus performed before all occurrences of the P-2 procedure.

According to a second example the beam management procedure is performed according to a second configuration such that each occurrence of the second part of the beam management procedure is followed by one occurrence of the third part of the beam management procedure. In some aspects one occurrences of the P-2 procedure follows after each occurrence of the P-3 procedure.

There could be different ways to determine which configuration to use. In some aspects the order is determined according to a specification. Hence, according to an embodiment, whether to perform the beam management procedure according to the first configuration or the second configuration is determined according to a specification.

Figure 5:
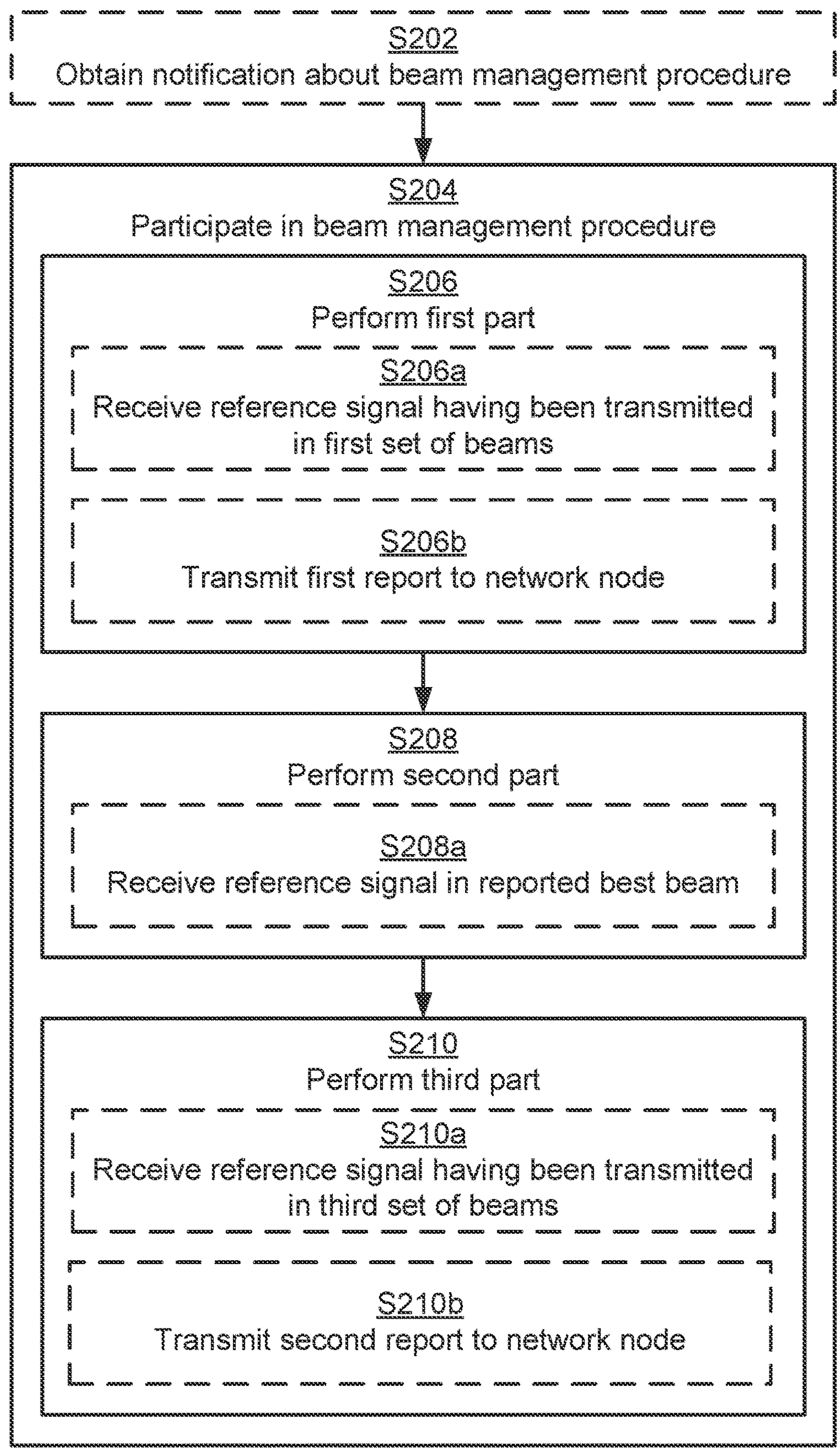

Reference is now made to FIG. 5 illustrating a method for participating in a beam management procedure as performed by the terminal device 300*a* according to an embodiment.

As disclosed above, it is assumed that a beam management procedure is to be performed. Thus the terminal device 300*a*-300*f* is configured to perform step S204:

S204: The terminal device 300*a*-300*f* participates in a beam management procedure with the network node 200 serving the terminal device 300*a*-300*f*. Participating in the beam management procedure comprises steps S206, S208, and S210.

As disclosed above, the beam management procedure comprises a first part. Particularly, the terminal device 300*a*-300*f* is configured to perform step S206:

S206: The terminal device 300*a*-300*f* identifies, during a first part of the beam management procedure, which beam in a first set of beams 140*a*, 140*b*, 140*c*, in which a reference signal is transmitted from the network node 200, is received with highest received power.

As disclosed above, the beam management procedure comprises a second part. Particularly, the terminal device 300*a*-300*f* is configured to perform step S208:

S208: The terminal device 300*a*-300*f* identifies, during a second part of the beam management procedure, in which beam in a second set of beams 150*a*, 150*b*, 150*c*, in which the reference signal is received from the network node 200, is received with highest received power.

As disclosed above, the beam management procedure comprises a third part. Particularly, the terminal device 300*a*-300*f* is configured to perform step S210:

S210: The terminal device 300*a*-300*f* identifies, during a third part of the beam management procedure, which beam in a third set of beams 140*b-a*, 140*b-b*, 140*b-c*, in which the reference signal is transmitted from the network node 200, that the reference signal with highest received power. The reference signal is received using the beam identified during the second part of the beam management procedure.

Embodiments relating to further details of participating in a beam management procedure as performed by the terminal device 300*a* will now be disclosed.

As disclosed above, in some aspects the network node 200 provides information to the terminal devices 300*a*-300*f* about the beam management procedure. Particularly, according to an embodiment the terminal device 300*a*-300*f* is configured to perform (optional) step S202:

S202: the terminal device 300*a*-300*f* obtains, from the network node 200, information regarding the beam management procedure before participating in the beam management procedure.

Examples of different types of reference signals that the network node 200 might transmit (and thus the terminal device 300*a*-300*f* might received) have been disclosed above.

Aspects of participating in the first part of the beam management procedure will now be disclosed.

As disclosed above, the first part of the beam management procedure might involve the network node 200 to transmit the reference signal in each beam in the first set of beams 140*a*, 140*b*, 140*c*. Particularly, according to an embodiment the terminal device 300*a*-300*f* is configured to perform (optional) step S206*a*:

S206*a*: The terminal device 300*a*-300*f* receives, from the network node 200, one occurrence of the reference signal in at least one of the beams in the first set of beams 140*a*, 140*b*, 140*c*.

Step S206*a* is in some aspects part of step S206.

The terminal device 300*a*-300*f* might then measure received power of the reference signal in the transmitted beams as received by the terminal device 300*a*-300*f* and report this to the network node 200. Particularly, according to an embodiment the terminal device 300*a*-300*f* is configured to perform (optional) step S206*b*:

S206*b*: The terminal device 300*a*-300*f* transmits to the network node 200, a first report identifying at least that beam in the first set of beams 140*a*, 140*b*, 140*c* having been received with highest received power at the terminal device 300*a*-300*f*.

Step S206*b* is in some aspects part of step S206.

Aspects of participating in the second part of the beam management procedure will now be disclosed.

As disclosed above, the second part of the beam management procedure might involve the network node 200 to transmit the reference signal in those beams in the first set of beams 140*a*, 140*b*, 140*c* for which at least one first report has been received. Particularly, according to an embodiment the terminal device 300*a*-300*f* is configured to perform (optional) step S208*a*:

S208*a*: The terminal device 300*a*-300*f* receives a configured number of occurrences of the reference signal as transmitted by the network node 200 in those beams in the first set of beams 140*a*, 140*b*, 140*c* identified in the first report. One respective occurrence is by the terminal device 300*a*-300*f* received in one respective beam in the second set of beams 150*a*, 150*b*, 150*c*.

Step S208*a* is in some aspects part of step S208.

The terminal device 300*a*-300*f* might then measure received power of the reference signal as received by the terminal device 300*a*-300*f* in each of the beams in the second set of beams 150*a*, 150*b*, 150*c*.

Aspects of participating in the third part of the beam management procedure will now be disclosed.

As disclosed above, the third part of the beam management procedure might involve the network node 200 to transmit the reference signal in those beams 140*b*-*a*, 140*b*-*b*, 140*b*-*c* covered by those beams in the first set of beams 140*a*, 140*b*, 140*c* being identified in the first reports. Particularly, according to an embodiment the terminal device 300*a*-300*f* is configured to perform (optional) step S210*a*:

S210*a*: The terminal device 300*a*-300*f* receives, from the network node 200, one occurrence of the reference signal in at least one of the beams in that respective third set of beams 140*b*-*a*, 140*b*-*b*, 140*b*-*c* covered by one of those beams in the first set of beams 140*a*, 140*b*, 140*c* being identified in the first report.

Step S210*a* is in some aspects part of step S210.

The terminal device 300*a*-300*f* might then measure received power of the reference signal in the transmitted beams as received by the terminal device 300*a*-300*f* and report this to the network node 200. Particularly, according to an embodiment the terminal device 300*a*-300*f* is configured to perform (optional) step S210*b*:

S210*b*: The terminal device 300*a*-300*f* transmits, to the network node 200, a second report identifying at least that beam in the third set of beams 140*b*-*a*, 140*b*-*b*, 140*b*-*c* having been received with highest received power at the terminal device 300*a*-300*f*.

The thus selected beam in the second set of beams and the thus selected beam in the third set of beams can then be used for communication between the network node 200 and the terminal device 300*a*-300*f*.

Figure 6:
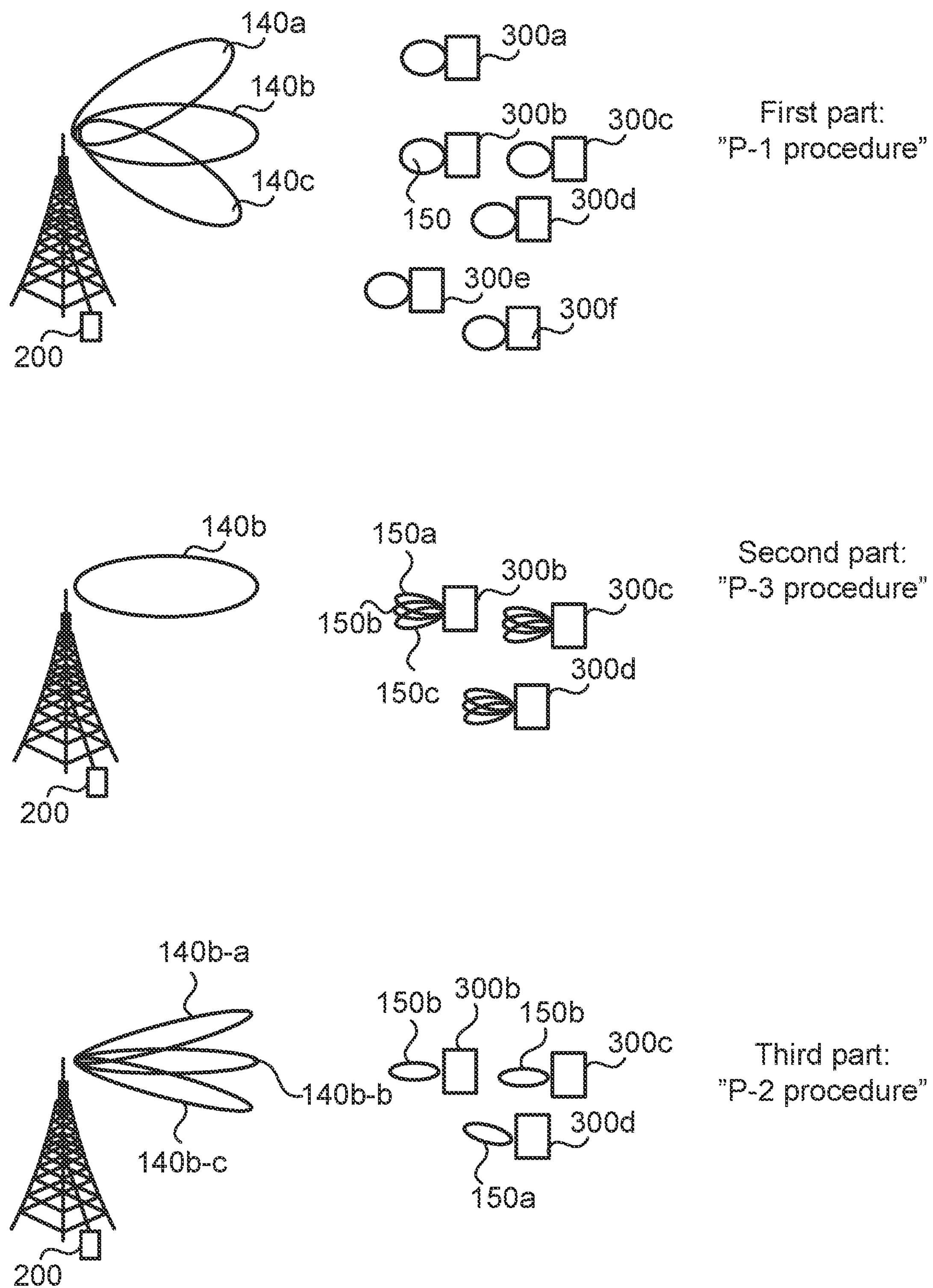
FIG. 6 is a schematic illustration of a beam management procedure according to embodiments.

Reference is now made to FIG. 6, illustrating one example of a beam management process according to the herein disclosed embodiments.

In the first part a P-1 procedure common for all terminal devices 300*a*-300*f* is performed by the network node 200 transmitting a reference signal in wide beams 140*a*, 140*b*, 140*c*. The terminal devices 300*a*-300*f* are expected to use as wide receive beam 150 as possible in order to capture all possible propagation paths. Each terminal device 300*a*-300*f* reports back at least the best beam of the wide beam 140*a*, 140*b*, 140*c* to the network node 200. In the illustrative example of FIG. 6, terminal device 300*a* reports wide beam 140*a*, terminal devices 300*b*-300*d* report wide beam 140*b*, and terminal devices 300*e*, 300*f* report back wide beam 140*c*. Since terminal devices 300*b*-300*d* all report the same wide beam 140*b* they are grouped together in one group and since terminal devices 300*e*, 300*f* both report the same wide beam 140*c* they are grouped together in another group.

In the second part a shared P-3 procedure is performed for terminal devices 300*b*-300*d*. During the shared P-3 procedure the reference signals are transmitted repeatedly by the network node 200 in wide beam 140*b* in order to let the terminal devices 300*b*-300*d* determine a suitable narrow receive beam from a set of beams 150*a*, 150*b*, 150*c*. In the illustrative example of FIG. 6 it is assumed that terminal device 300*b* finds narrow beam 150*b* to be best, that terminal device 300*c* finds narrow beam 150*b* to be best, and that terminal device 300*d* finds narrow beam 150*a* to be best. A shared P-3 procedure is also performed for terminal devices 300*e*, 300*f* where the network node 200 uses wide beam 140*c*, and another P-3 procedure is performed just for terminal device 300*a* where the network node 200 uses wide beam 140*a*.

In the third part a shared P-2 procedure is performed for terminal devices 300*b*-300*d* in order to refine the transmit beam at the network node 200. During the shared P-2 procedure the reference signal is transmitted in narrow beams 140*b*-*a*, 140*b*-*b*, 140*b*-*c*, covered by the angular span of the wide beam 140*b* reported as best by the terminal devices 300*b*-300*d*. It is here noted that for illustrative purposes the narrow beams 140*b*-*a*, 140*b*-*b*, 140*b*-*c* in FIG. 6 have a wide angular span than the wide beam 140*b*. Each terminal device 300*b*-300*d* reports back at least the best beam of the narrow beams 140*b*-*a*, 140*b*-*b*, 140*b*-*c* to the network node 200. A shared P-2 procedure is also performed for terminal devices 300*e*, 300*f* where the network node 200 uses narrow beams covered by wide beam 140*c*, and another P-2 procedure is performed just for terminal device 300*a* where the network node 200 uses narrow beams covered by wide beam 140*a*.

Figure 1:
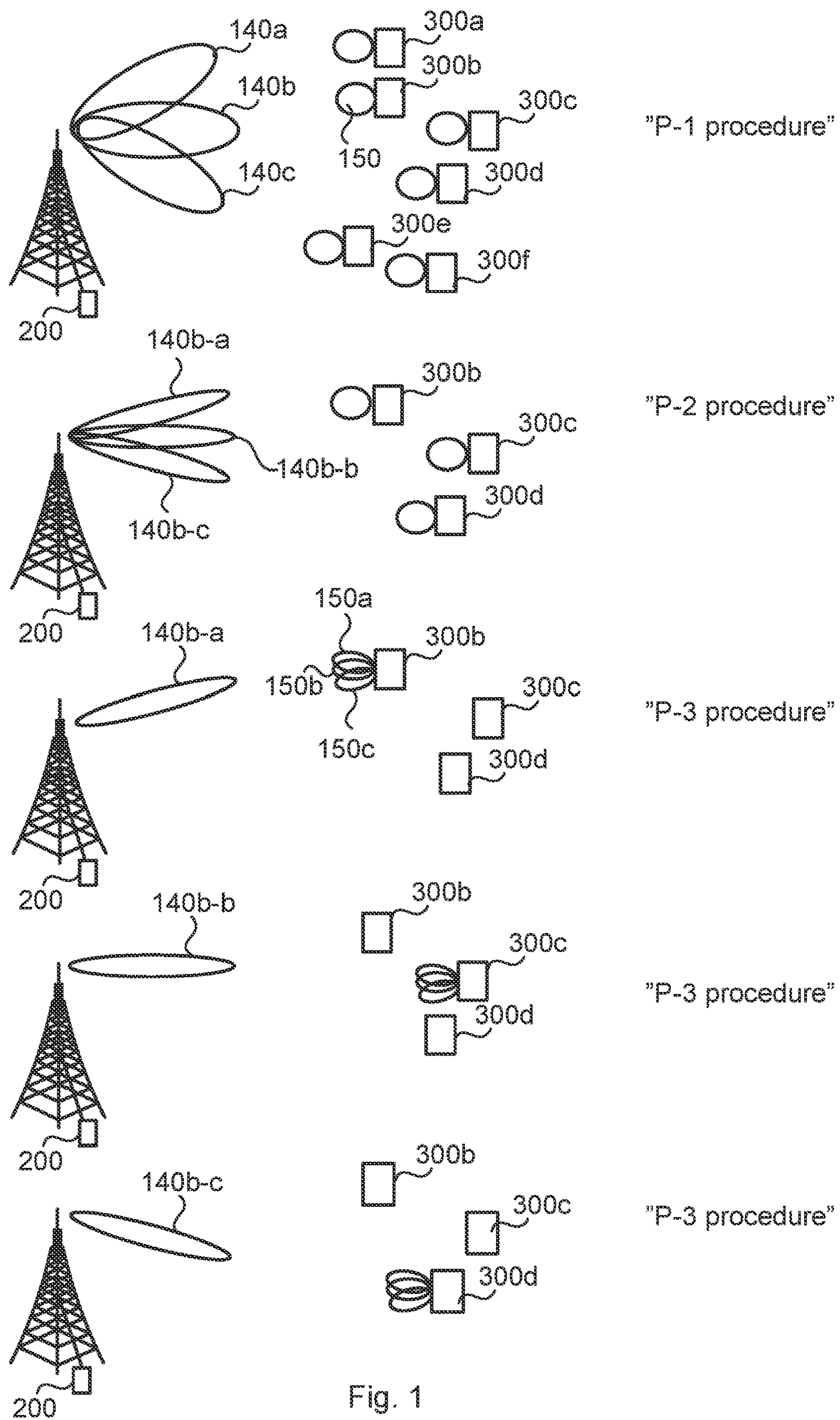
FIG. 1 is a schematic illustration of a conventional beam management procedure.
Figure 2:
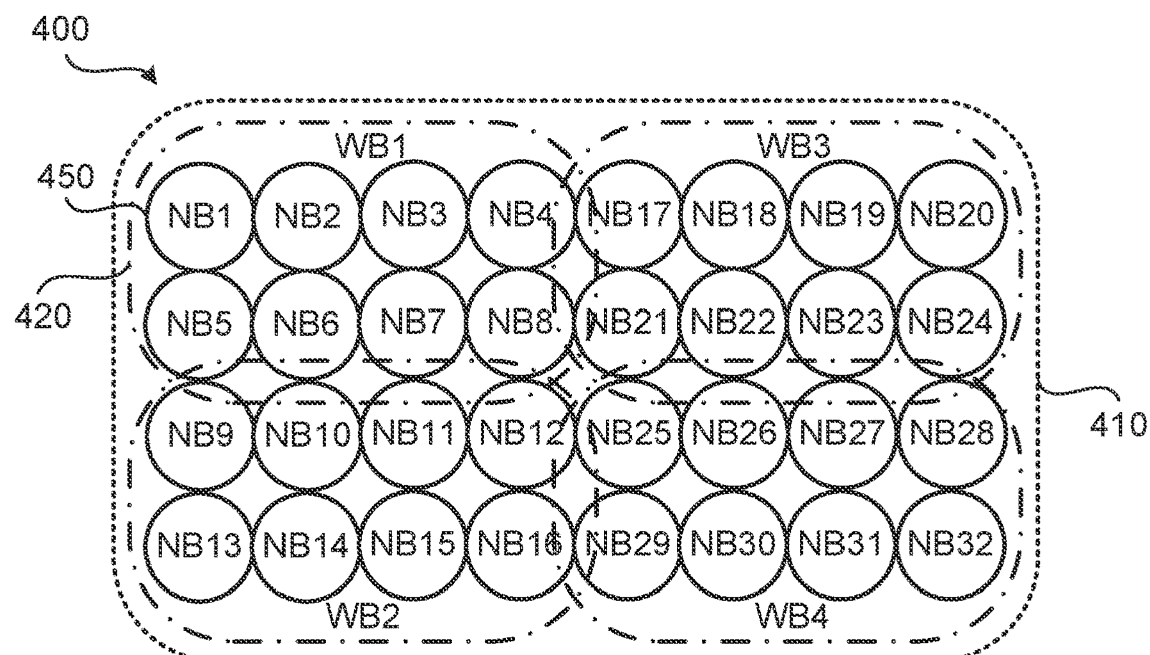
FIG. 2 is a schematic diagram illustrating beams.

Since both the P-2 procedure and the P-3 procedure are shared between all terminal devices in each group the overhead needed for reference signal transmission has been minimized. If, instead the P-2 procedure was performed before the P-3 procedure, it would not be possible to share the P-3 procedure between groups of terminal devices because the different terminal devices 300*a*-300*f* will likely have different best narrow transmission beams at the network node 200, and then one P-3 procedure has to be performed for each narrow transmit beam separately, as illustrated in FIG. 1.

Figure 7A:
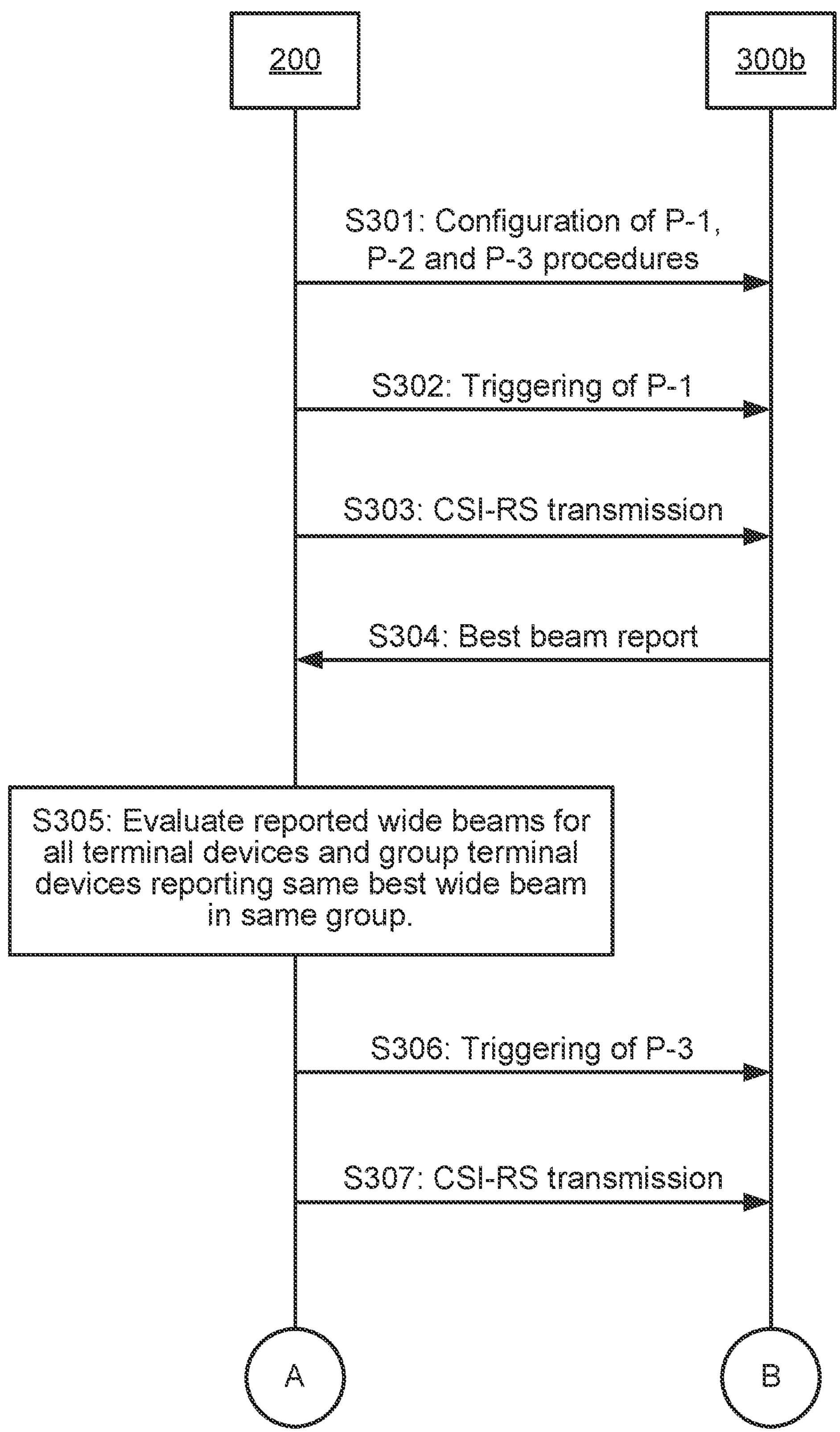
FIG. 7*a* and FIG. 7*b* illustrate a signalling diagram according to an embodiment.
Figure 7B:
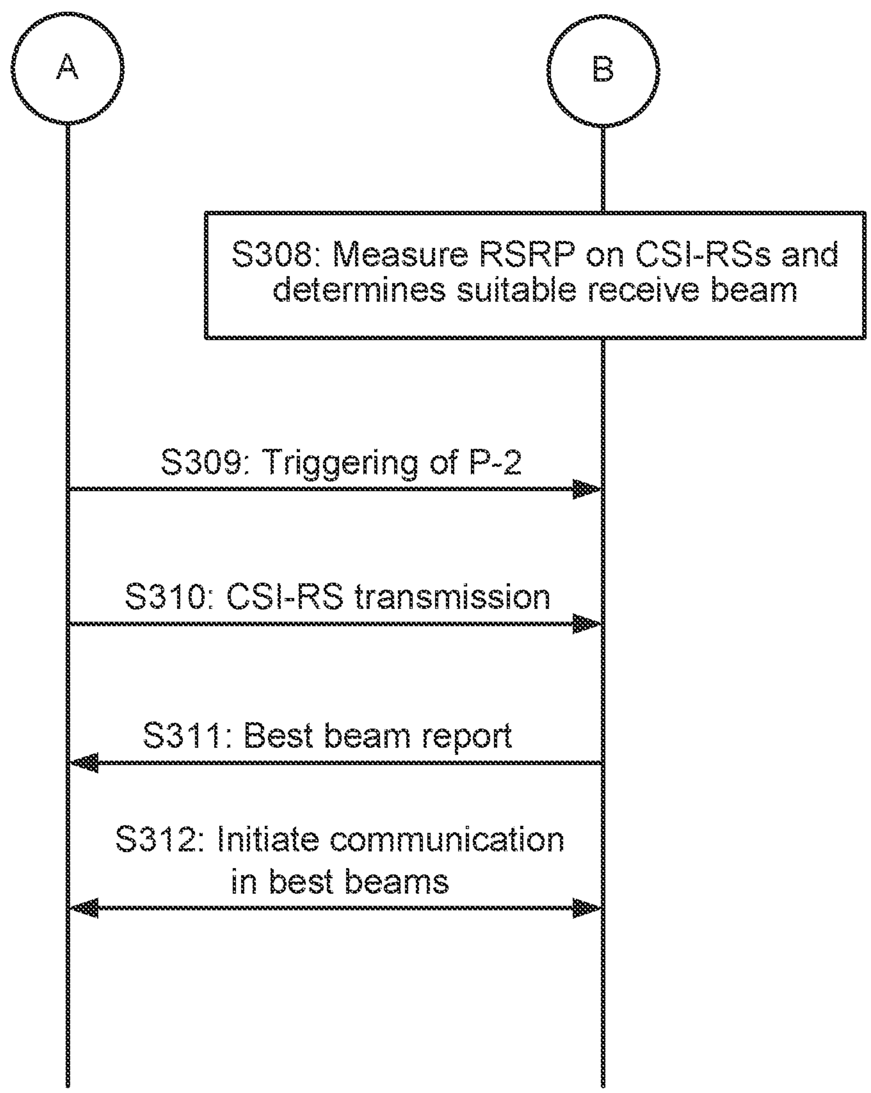

One particular embodiment of a beam management procedure, and for participating in the same, based on at least some of the above disclosed embodiments will now be disclosed in detail with reference to the signalling diagram of FIG. 7*a* and FIG. 7*b*. Parallel reference is continued to FIG. 6.

S301: The network node 200 configures the P-1, P-2 and P-3 procedures (such as which resources to use and settings for the reports to be sent by the terminal devices participating in the beam management procedure) and signals, using higher layer signaling, a notification thereof to the terminal device 300*b*. One way to implement step S301 is to perform step S102 and step S202.

S302: The network node 200 triggers the P-1 procedure by signaling a P-1 trigger command to the terminal device 300*b*.

S303: The network node 200 transmits CSI-RSs in wide beams 140*a*, 140*b*, 140*c* and the terminal device 300*b* receives the CSI-RSs in a wide beam 150 and performs RSRP measurements on the CSI-RSs. One way to implement step S303 is to perform steps S104, S106, S106*a* and steps S204, S206, S206*a*.

S304: The terminal device 300*b* signals a first beam report to the network node 200, providing information about the best wide beam and the corresponding RSRP value.

One way to implement step S304 is to perform steps S104, S106, S106*b* and steps S204, S206, S206*b*.

S305: The network node 200 groups the terminal devices such that terminal devices reporting the same best wide beam belong to the same group.

S306: The network node 200 triggers a shared P-3 procedure for each group in the best wide beam reported for that group, i.e. one P-3 procedure per group where all the terminal devices within one group share the same P-3 procedure.

S307: The network node 200 performs the P-3 procedure per group by transmitting the CSI-RS for the respective P-3 procedures using the wide beam as was reported per group. One way to implement step S307 is to perform steps S104, S108, S108*a* and step S204, S208, S208*a*.

S308: The terminal device 300*b* measures the RSRP for the CSI-RSs while sweeping its narrow beams 150*a*, 150*b*, 150*c* and selects the narrow beam 150*b* with highest RSRP value.

S309: The network node 200 triggers a shared P-2 procedure for each group, i.e. one P-2 procedure per group where all terminal devices within one group share the same P-2 procedure.

S310: The network node 200 transmits the CSI-RS for the respective P-2 procedure per group in narrow beams 140*b-a*, 140*b-b*, 140*b-c*, where all narrow beams 140*b-a*, 140*b-b*, 140*b-c*, are confined within the reported best wide beam 140*b* per group. One way to implement step S310 is to perform steps S104, S111, S110*a* and step S204, S210, S210*a*.

S311: The terminal device 300*b* uses its selected narrow beam 150*b* to measure the RSRP for the different CSI-RSs and report the best narrow beam 140*b-b* to the network node 200. One way to implement step S311 is to perform steps S104, S110, S110*b* and step S204, S210, S210*b*.

S312: The network node 200 and the terminal device 300*b* initiate data communication using the beam pair link defined by the narrow beam 140*b-b* at the network node 200 and the narrow beam 150*b* at the terminal device 300*b*.

Figure 8:
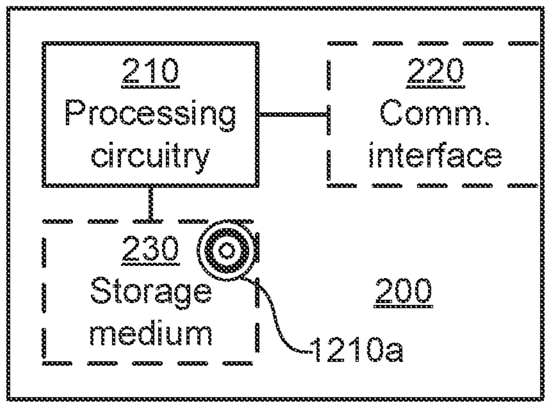
FIG. 8 is a schematic diagram showing functional units of a network node according to an embodiment.

FIG. 8 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210*a* (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, functions, nodes, and devices of the communications network 100. As such the communications interface 220 may comprise one or more transmitters and receivers, comprising analogue and digital components.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 9:
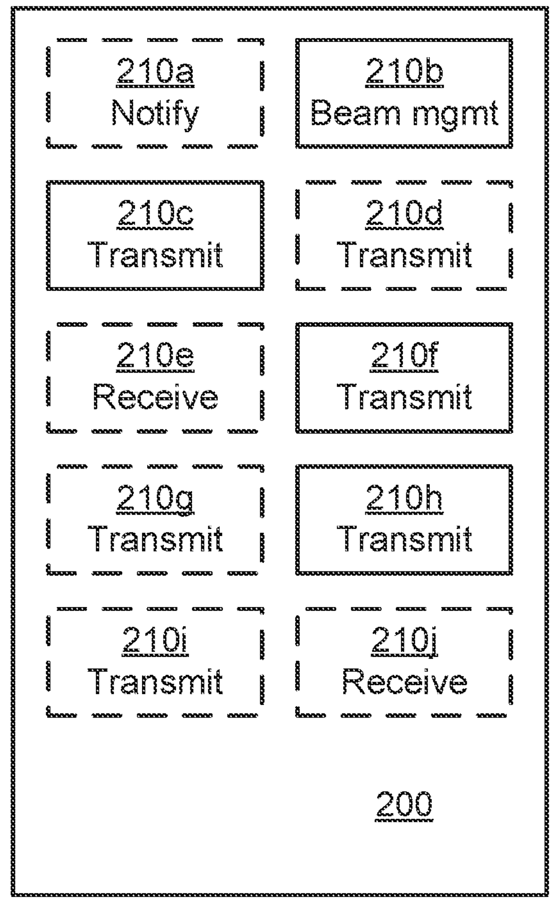
FIG. 9 is a schematic diagram showing functional modules of a network node according to an embodiment.

FIG. 9 schematically illustrates, in terms of a number of functional modules, the components of a network node 200 according to an embodiment. The network node 200 of FIG. 9 comprises a number of functional modules; a beam management module 210*b* configured to perform step S104, a transmit module 210*c* configured to perform step S106, a transmit module 210*f* configured to perform step S108, and a transmit module 210*h* configured to perform step S110. The network node 200 of FIG. 9 may further comprise a number of optional functional modules, such as any of a notify module 210*a* configured to perform step S102, a transmit module 210*d* configured to perform step S106*a*, a receive module 210*e* configured to perform step S106*b*, a transmit module 210*g* configured to perform step S108*a*, a transmit module 210*i* configured to perform step S110*a*, a receive module 210*j* configured to perform step S110*b*.

In general terms, each functional module 210*a*-210*j* may be implemented in hardware or in software. Preferably, one or more or all functional modules 210*a*-210*j* may be implemented by the processing circuitry 210, possibly in cooperation with the communications interface 220 and/or the storage medium 230. The processing circuitry 210 may thus be arranged to form the storage medium 230 fetch instructions as provided by a functional module 210*a*-210*j* and to execute these instructions, thereby performing any steps of the network node 200 as disclosed herein.

The network node 200 may be provided as a standalone device or as a part of at least one further device. For example, the network node 200 may be provided in a node of the radio access network 110 or in a node of the core network 120. Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the radio access network 110 than instructions that are not required to be performed in real time.

Thus, a first portion of the instructions performed by the network node 200 may be executed in a first device, and a second portion of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 8 the processing circuitry 210 may be distributed among a plurality of devices, or nodes. The same applies to the functional modules 210*a*-210*j* of FIG. 9 and the computer program 1220*a* of FIG. 12.

Figure 10:
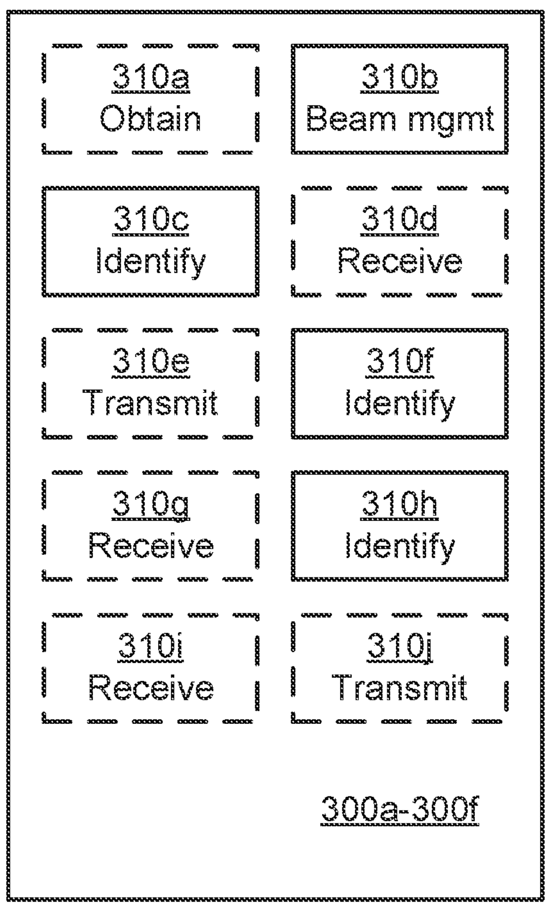
FIG. 10 is a schematic diagram showing functional units of a terminal device according to an embodiment.

FIG. 10 schematically illustrates, in terms of a number of functional units, the components of a terminal device 300*a* according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210*b* (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the terminal device 300*a* to perform a set of operations, or steps, as disclosed above. For example, the storage medium 330 may store the set of operations, and the processing circuitry 310 may be configured to retrieve the set of operations from the storage medium 330 to cause the terminal device 300*a* to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The terminal device 300*a* may further comprise a communications interface 320 for communications with entities, functions, nodes, and devices of the communications network 100. As such the communications interface 320 may comprise one or more transmitters and receivers, comprising analogue and digital components.

The processing circuitry 310 controls the general operation of the terminal device 300*a* e.g. by sending data and control signals to the communications interface 320 and the storage medium 330, by receiving data and reports from the communications interface 320, and by retrieving data and instructions from the storage medium 330. Other components, as well as the related functionality, of the terminal device 300*a* are omitted in order not to obscure the concepts presented herein.

Figure 11:
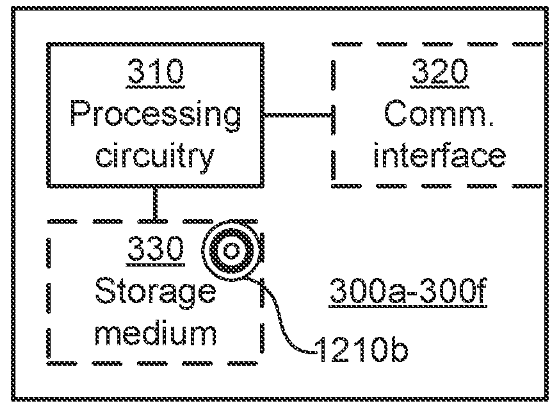
FIG. 11 is a schematic diagram showing functional modules of a terminal device according to an embodiment.

FIG. 11 schematically illustrates, in terms of a number of functional modules, the components of a terminal device 300*a* according to an embodiment. The terminal device 300*a* of FIG. 11 comprises a number of functional modules; a beam management module 310*b* configured to perform step S204, an identify module 310*c* configured to perform step S206, an identify module 310*f* configured to perform step S208, and an identify module 310*h* configured to perform step S210. The terminal device 300*a* of FIG. 11 may further comprise a number of optional functional modules, such as any of an obtain module 310*a* configured to perform step S202, a receive module 310*d* configured to perform step S206*a*, a transmit module 310*e* configured to perform step S206*b*, a receive module 310*g* configured to perform step S208, a receive module 310*i* configured to perform step S210*a*, a transmit module 310*j* configured to perform step S210*b*.

In general terms, each functional module 310*a*-310*j* may be implemented in hardware or in software. Preferably, one or more or all functional modules 310*a*-310*j* may be implemented by the processing circuitry 310, possibly in cooperation with the communications interface 320 and/or the storage medium 330. The processing circuitry 310 may thus be arranged to form the storage medium 330 fetch instructions as provided by a functional module 310*a*-310*j* and to execute these instructions, thereby performing any steps of the terminal device 300*a* as disclosed herein.

Figure 12:
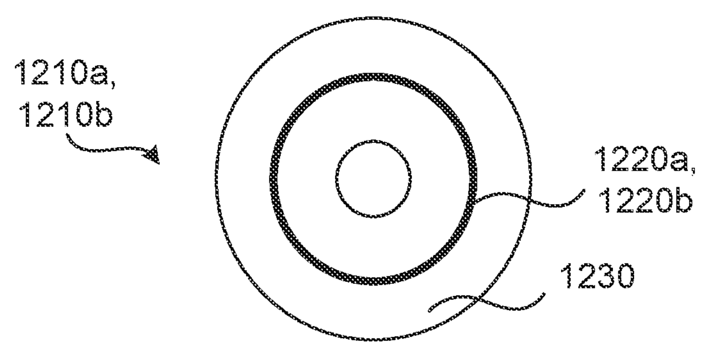
FIG. 12 shows one example of a computer program product comprising computer readable means according to an embodiment.

FIG. 12 shows one example of a computer program product 1210*a*, 1210*b* comprising computer readable means 1230. On this computer readable means 1230, a computer program 1220*a* can be stored, which computer program 1220*a* can cause the processing circuitry 210 and thereto operatively coupled entities and devices, such as the communications interface 220 and the storage medium 230, to execute methods according to embodiments described herein. The computer program 1220*a* and/or computer program product 1210*a* may thus provide means for performing any steps of the network node 200 as herein disclosed. On this computer readable means 1230, a computer program 1220*b* can be stored, which computer program 1220*b* can cause the processing circuitry 310 and thereto operatively coupled entities and devices, such as the communications interface 320 and the storage medium 330, to execute methods according to embodiments described herein. The computer program 1220*b* and/or computer program product 1210*b* may thus provide means for performing any steps of the terminal device 300*a* as herein disclosed.

In the example of FIG. 12, the computer program product 1210*a*, 1210*b* is illustrated as an optical disc, such as a CD (compact disc) or a DVD (digital versatile disc) or a Blu-Ray disc. The computer program product 1210*a*, 1210*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220*a*, 1220*b* is here schematically shown as a track on the depicted optical disk, the computer program 1220*a*, 1220*b* can be stored in any way which is suitable for the computer program product 1210*a*, 1210*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. A network node for beam management, the network node comprising processing circuitry, the processing circuitry being configured to cause the network node to:

perform a beam management procedure for terminal devices served by the network node, wherein performing the beam management procedure comprises:

transmitting, during a first part of the beam management procedure, a first reference signal so as to enable more than one of the terminal devices participating in the beam management procedure to identify in which beam, in a first set of beams in which the first reference signal is transmitted from the network node, the first reference signal is received with highest received power, for reporting in a respective first report;

transmitting, during a second part of the beam management procedure, distinct from the first part, a second reference signal so as to enable the more than one of the terminal devices to identify in which beam, in a second set of beams in which the second reference signal is received from the network node by the terminal devices, the second reference signal is received with highest received power; and transmitting, during a third part of the beam management procedure, a third reference signal so as to enable the more than one of the terminal devices participating in the beam management procedure to identify for which beam, in a third set of beams in which the third reference signal is received, by each respective more than one of the terminal devices, with highest received power, wherein there is one respective third set of beams for each respective beam in the first set of beams identified in the respective first reports, wherein the third part of the beam management procedure is performed for at least one beam in each respective third set of beams, and wherein the second part is performed before the third part for each respective more than one of the terminal devices.

2. The network node of claim 1, wherein one or more of:

the first reference signal is a synchronization signal block (SSB), the second reference signal is a channel state information reference signal (CSI-RS), and the third reference signal is a channel state information reference signal (CSI-RS).

3. The network node of claim 1, wherein the first part of the beam management procedure comprises:

transmitting, towards the more than one terminal devices served by the network node, one occurrence of the first reference signal in each beam in the first set of beams; and receiving, from each of the more than one terminal devices, a respective first report identifying at least that beam in the first set of beams having been received with highest received power at that respective terminal device.

4. The network node of claim 3, wherein each occurrence of the second part of the beam management procedure comprises:

transmitting a number of occurrences of the second reference signal in one of those beams in the first set of beams for which at least one first report has been received.

5. The network node of claim 4, wherein one occurrence of the second part of the beam management procedure is performed per beam in the first set of beams for which the at least one first report has been received, and wherein each occurrence of the second part of the beam management procedure is performed for those of the terminal devices for which a same beam in the first set of beams was received with highest received power.

6. The network node of claim 4, wherein the number of occurrences is defined by number of beams in the second set of beams.

7. The network node of claim 4, wherein in which order to perform the second part of the beam management procedure for, with respect to the beams in the first set of beams, depends on how many of the more than one terminal devices have identified each of the beams in the first set of beams as received with highest received power.

8. The network node of claim 4, wherein each occurrence of the third part of the beam management procedure comprises:

transmitting one occurrence of the third reference signal in each beam in that respective third set of beams covered by one of those beams in the first set of beams being identified in the respective first reports; and receiving, from each of the more than one terminal devices having received the third reference signal in at least one of the beams in the third set of beams, a respective second report identifying at least that beam in the third set of beams having been received with highest received power at that respective terminal device.

9. The network node of claim 8, wherein one occurrence of the third part of the beam management procedure is performed per third set of beams, and wherein each occurrence of the third part of the beam management procedure is performed for those of the terminal devices for which a same beam in the first set of beams was received with highest received power.

10. The network node of claim 1, wherein the beam management procedure is performed according to a first configuration such that all occurrences of the second part of the beam management procedure are performed before any occurrence of the third part of the beam management procedure are performed.

11. The network node of claim 1, wherein the beam management procedure is performed according to a second configuration such that each occurrence of the second part of the beam management procedure is followed by one occurrence of the third part of the beam management procedure.

12. The network node of claim 1, further comprising:

providing, to the terminal devices, information regarding the beam management procedure before performing the beam management procedure.

13. A terminal device for participating in a beam management procedure, the terminal device comprising radio circuitry and processing circuitry operatively coupled to the radio circuitry, the processing circuitry being configured to cause the terminal device to:

participate in the beam management procedure with a network node serving the terminal device, wherein participating in the beam management procedure comprises:

during a first part of the beam management procedure, receiving one occurrence of a first reference signal, transmitted by the network node in a first set of beams, and transmitting, to the network node, a first report identifying at least a first beam, in the first set of beams, in which the first reference signal has been received with highest received power at the terminal device;

during a second part of the beam management procedure, distinct from the first part, receiving a number of occurrences of a second reference signal, transmitted by the network node in the at least first beam, wherein one respective occurrence is received, by the terminal device, in one respective beam in a second set of beams, where the second reference signal is received with highest received power in at least a second beam comprised in the second set of beams; and during a third part of the beam management procedure, following the second part, receiving, one occurrence of a third reference signal, transmitted by the network node in a third set of beams covered by the at least first beam; wherein the third reference signal is received in the second beam, and transmitting, to the network node, a second report identifying at least a third beam in the third set of beams, in which the third reference signal is received with highest received power at the terminal device.

14. The terminal device of claim 13, wherein one or more of:

the first reference signal is a synchronization signal block (SSB);

the second reference signal is a channel state information reference signal (CSI-RS); and the third reference signal is a channel state information reference signal (CSI-RS).

15. The terminal device of claim 13, wherein the processing circuitry is further configured to:

obtain, from the network node, information regarding the beam management procedure before participating in the beam management procedure.

16. A method, by a network node, for beam management for terminal devices served by the network node, the method comprising:

transmitting, during a first part of the beam management procedure, a first reference signal so as to enable more than one of the terminal devices participating in the beam management procedure to identify in which beam, in a first set of beams in which the first reference signal is transmitted from the network node, the first reference signal is received with highest received power, for reporting in a respective first report;

transmitting, during a second part of the beam management procedure, distinct from the first part, a second reference signal so as to enable the more than one of the terminal devices to identify in which beam, in a second set of beams in which the second reference signal is received from the network node by the terminal devices, the second reference signal is received with highest received power; and transmitting, during a third part of the beam management procedure, a third reference signal so as to enable the more than one of the terminal devices participating in the beam management procedure to identify for which beam, in a third set of beams in which the third reference signal is received, by each respective more than one of the terminal devices, with highest received power, wherein there is one respective third set of beams for each respective beam in the first set of beams identified in the respective first reports, wherein the third part of the beam management procedure is performed for at least one beam in each respective third set of beams, and wherein the second part is performed before the third part for each respective more than one of the terminal devices.

17. A method for participating in a beam management procedure, the method being performed by a terminal device, the method comprising:

during a first part of the beam management procedure, receiving one occurrence of a first reference signal, transmitted by the network node in a first set of beams, and transmitting, to the network node, a first report identifying at least a first beam, in the first set of beams, in which the first reference signal has been received with highest received power at the terminal device;

during a second part of the beam management procedure, distinct from the first part, receiving a number of occurrences of a second reference signal, transmitted by the network node in the at least first beam, wherein one respective occurrence is received, by the terminal device, in one respective beam in a second set of beams, where the second reference signal is received with highest received power in at least a second beam comprised in the second set of beams; and during a third part of the beam management procedure, following the second part, receiving, one occurrence of a third reference signal, transmitted by the network node in a third set of beams covered by the at least first beam; wherein the third reference signal is received in the second beam, and transmitting, to the network node, a second report identifying at least a third beam in the third set of beams, in which the third reference signal is received with highest received power at the terminal device.

18. A non-transitory computer-readable medium comprising, stored thereupon, a computer program for beam management, the computer program comprising computer code which, when run on processing circuitry of a network node, causes the network node to carry out a beam management procedure for terminal devices served by the network node by:

transmitting, during a first part of the beam management procedure, a first reference signal so as to enable more than one of the terminal devices participating in the beam management procedure to identify in which beam, in a first set of beams in which the first reference signal is transmitted from the network node, the first reference signal is received with highest received power, for reporting in a respective first report;

transmitting, during a second part of the beam management procedure, distinct from the first part, a second reference signal so as to enable the more than one of the terminal devices to identify in which beam, in a second set of beams in which the second reference signal is received from the network node by the terminal devices, the second reference signal is received with highest received power; and transmitting, during a third part of the beam management procedure, a third reference signal so as to enable the more than one of the terminal devices participating in the beam management procedure to identify for which beam, in a third set of beams in which the third reference signal is received, by each respective more than one of the terminal devices, with highest received power, wherein there is one respective third set of beams for each respective beam in the first set of beams identified in the respective first reports, wherein the third part of the beam management procedure is performed for at least one beam in each respective third set of beams, and wherein the second part is performed before the third part for each respective more than one of the terminal devices.

19. A non-transitory computer-readable medium, comprising, stored thereupon, a computer program for participating in a beam management procedure, the computer program comprising computer code which, when run on processing circuitry of a terminal device, causes the terminal device to participate in a beam management procedure with a network node serving the terminal device, by:

during a first part of the beam management procedure, receiving one occurrence of a first reference signal, transmitted by the network node in a first set of beams, and transmitting, to the network node, a first report identifying at least a first beam, in the first set of beams, in which the first reference signal has been received with highest received power at the terminal device;

during a second part of the beam management procedure, distinct from the first part, receiving a number of occurrences of a second reference signal, transmitted by the network node in the at least first beam, wherein one respective occurrence is received, by the terminal device, in one respective beam in a second set of beams, where the second reference signal is received with highest received power in at least a second beam comprised in the second set of beams; and during a third part of the beam management procedure, following the second part, receiving, one occurrence of a third reference signal, transmitted by the network node in a third set of beams covered by the at least first beam; wherein the third reference signal is received in the second beam, and transmitting, to the network node, a second report identifying at least a third beam in the third set of beams, in which the third reference signal is received with highest received power at the terminal device.

* * * * *

UNITED STATES PATENT AND TRADEMARK OFFICE

CERTIFICATE OF CORRECTION

PATENT NO. : 11,943,034 B2
APPLICATION NO. : 17/871193
DATED : March 26, 2024
INVENTOR(S) : Nilsson et al.

It is certified that error appears in the above-identified patent and that said Letters Patent is hereby corrected as shown below:

In the Specification

In Column 15, Line 57, delete "S111," and insert -- S110, --, therefor.

Signed and Sealed this
Sixteenth Day of July, 2024

Katherine Kelly Vidal

Katherine Kelly Vidal
*Director of the United States Patent and Trademark Office*